March 18, 1930.    G. W. FORD    1,750,883
APPARATUS FOR PRODUCING DISTORTED PICTURES
Filed Nov. 15, 1926    2 Sheets-Sheet 1
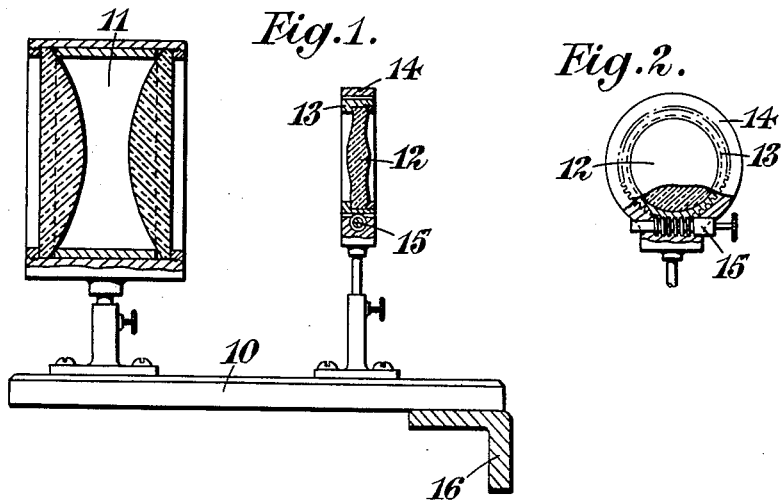
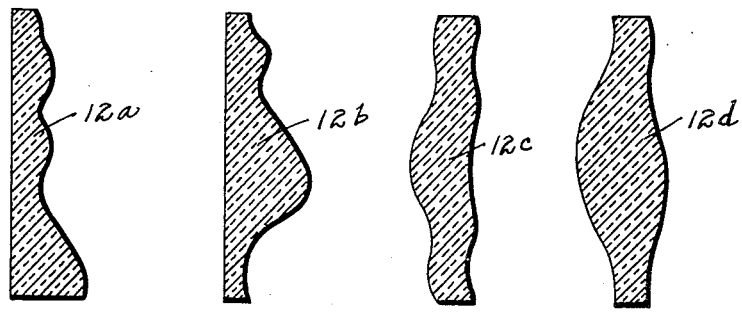
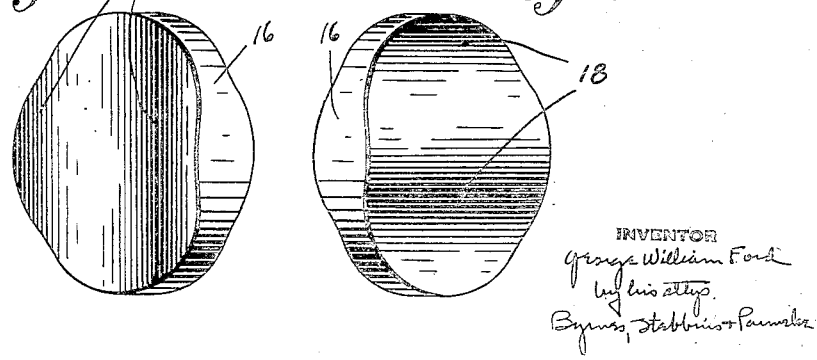
INVENTOR
George William Ford
by his attys.
Byrnes, Stebbins & Parmelee

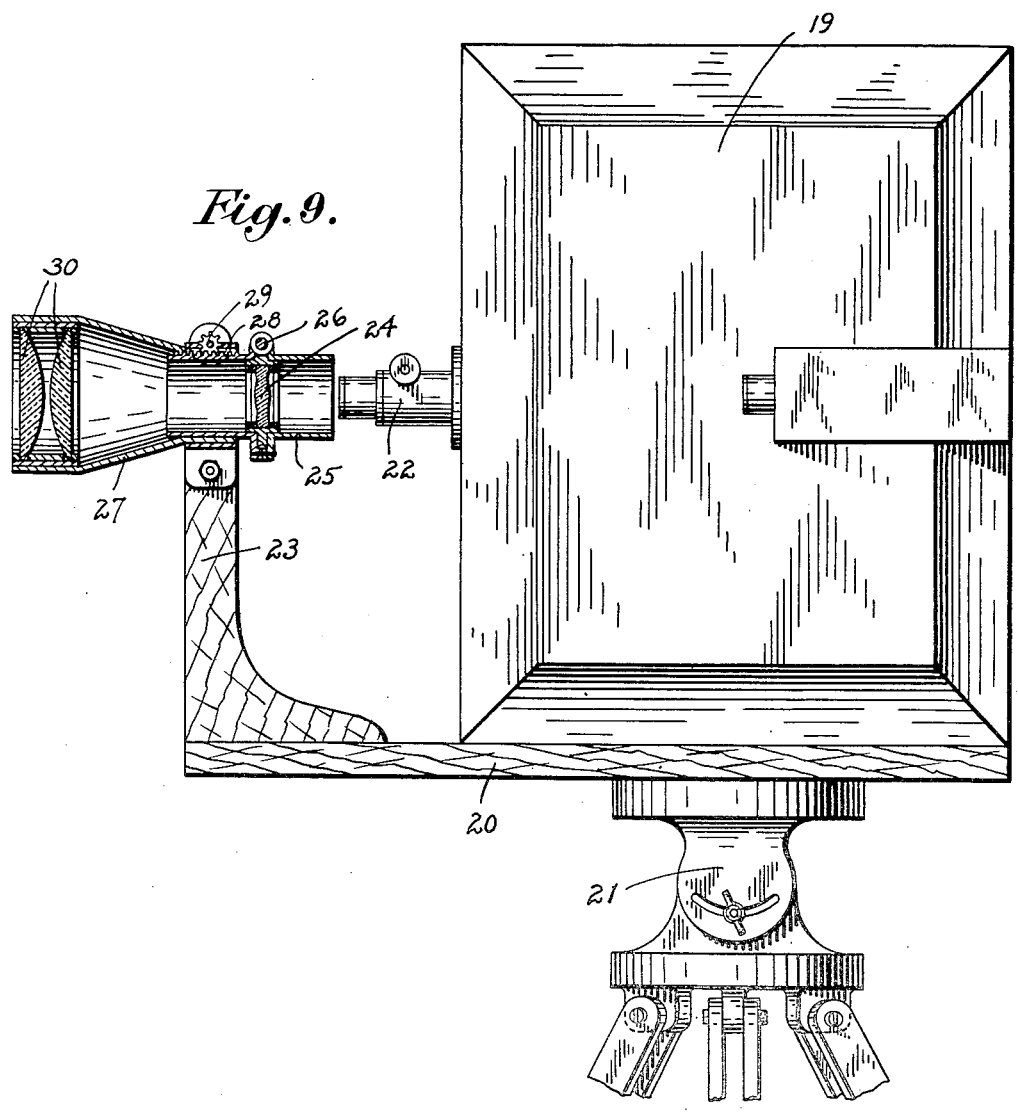

Patented Mar. 18, 1930

1,750,883

UNITED STATES PATENT OFFICE

GEORGE WILLIAM FORD, OF BRIGHTON, ENGLAND, ASSIGNOR TO HERBERT GEORGE PONTING, OF LONDON, ENGLAND

APPARATUS FOR PRODUCING DISTORTED PICTURES

Application filed November 15, 1926, Serial No. 148,379, and in Great Britain May 31, 1926.

This invention has for its object to provide a new and improved means for producing distorted pictures or reproductions of an object or scene, the result being either of a humorous, dramatic or a practical value.

When an object is viewed through an irregularly shaped transparent element, the view of it which is seen is distorted, but if the irregularities of the surface of the distorting element are comparable with the average thickness of the element, it is necessary that the element should be placed close to the object which is being viewed, as otherwise the whole of the object cannot be focussed simultaneously and blurring is superposed upon the distortion so that the desired effect is not satisfactorily obtained. The object of this invention is more particularly to enable distorted reproductions to be obtained of any size of object or scene.

According to this invention means for producing a distorted picture of an object comprises a lens or lens-combination so disposed as to present a reduced image of the object, and a refractive distorting element mounted near the point at which said image is produced so that the image can be viewed or reproduced by light passing through the said element.

According to another feature of this invention the distorting element aforesaid may be so mounted as to be movable in its own plane, being for example rotated about the optical axis of the system. This arrangement provides for changing the distorting effect, when the distorting element is not symmetrical about the optical axis of the system.

According to another feature of this invention, the parts aforesaid whereby the distorting effect is produced are constructed as a unit which is adapted to be attached to a camera, such as a kinematograph camera, or alternatively, the distorting apparatus may be constructed as a part of the camera.

In the acccompanying drawings, which illustrate the invention more or less diagrammatically—

Figure 1 is a side elevation in section showing the distorting apparatus;

Figure 2 is a partial end view of Figure 1 showing a detail;

Figures 3, 4, 5 and 6 are sectional views showing various forms of distorting element;

Figures 7 and 8 are perspective views showing opposite sides respectively of yet another form of distorting element, and Figure 9 shows one practical embodiment of the invention.

Like reference characters indicate like parts throughout the drawings.

Referring first to Figure 1, the apparatus comprises a suitable base-plate 10 whereon there is mounted a lens-combination indicated generally by the reference 11, this combination being such as will present a reduced image of the object or scene which is to be viewed or reproduced. Satisfactory results have been obtained by using two planoconvex lenses as shown, although any desired arrangement may be used. The only requisite is that the image should be of substantially the same dimensions as the distorting element now about to be referred to.

The distorting element as shown at 12 in Figure 1 is a disc-shaped piece of glass of irregular thickness, and it is secured in a mount 13 which is rotatable within the frame 14; any suitable means may be provided for imparting the rotary movement, as for example the worm-gear 15. This distorting element 12 is mounted with its optical axis coincident with that of the reducing lens 11, and when the device is mounted on a camera, this axis is also coincident with that of the camera lens. The base 10 is provided with any suitable brackets 16 or like means whereby it may be secured to a camera, or it may be constructed as an integral part thereof.

Figures 3, 4, 5 and 6 show at $12^a$, $12^b$, $12^c$, $12^d$, respectively various sections of distorting element, but it will be appreciated that any desired shaping of this element may be used, or any particular shaping to produce some particular result may be used.

Figures 7 and 8 show yet another form of distorting element 16 in which the two faces of the element are corrugated at 17, 18, respectively in directions at right-angles to one another.

An erecting lens may be used between the distorting element and the camera lens, if desired.

When the distorting element 12 is itself movable, it is possible to produce moving pictures from a still object, by moving the distorting element and so varying the distortion of the image in a succession of pictures.

Figure 9 shows in diagrammatic form the application of the distorting device of Figure 1 to a kinematograph or other camera. The camera, indicated generally by the reference 19, is mounted upon a base-board 20 carried upon the usual adjustable support 21. The lens of the camera is indicated at 22. In front of the camera there is provided on the baseboard 20 a bracket 23 whereon the optical distorting system is mounted so as to be in alignment with the lens 22. The distorting element 24 is mounted within a tubular body 25 and is arranged to be rotatable therein by means of a worm wheel 26 in a similar manner to that indicated at Figure 2. The tubular body 25 is arranged to slide within another tube 27 under the control of a rack 28 and pinion 29, and the tube 27 has mounted in its open end the lens system 30 corresponding to the lenses 11 of Figure 1. The rack and pinion adjustment of the tube 25 and the tube 27 permits focussing of the image produced by the lens system 30 at the desired point near the distorting element 24, and if desired the whole distorting element may be adjustable towards and away from the camera, for example by arranging the bracket 23 so that it is adjustable on the base-board 20, or alternatively the camera 19 may be adjustable on the base-board towards or away from the distorting element.

This invention is not limited to the production of distorted photographs or distorted kinematograph films, for the device may be used for viewing or projecting an object or a scene to see a distorted picture thereof. Thus, for example, if the amount of distortion be kept small, the device can be used for producing at will a reproducible variety of caricatures of people by viewing ordinary pictures of them through the device, and it will be appreciated that humorous effects can be produced in various other ways.

The apparatus may be used in connection with the projection of pictures or the taking of pictures. When it is desired to reproduce a distorted image on a film or photographic plate mounted in the camera, a transparency such as a small section of a plate or film is positioned at the position occupied by the "reduced image." The light rays passing through the transparency and the distorting element reach the camera lens and produce a distorted picture upon the plate or film in the camera.

I claim:—

1. Means for producing distorted pictures of an object comprising the combination of a camera, a refractive distorting element situated in front of the lens thereof, and means for producing a real image of the object adjacent the said element.

2. Means for producing distorted pictures of an object comprising the combination of a camera, a refractive distorting element situated in front of the lens thereof, and means for producing a real image of the object adjacent to and of not greater dimensions than the said element.

3. Means for producing distorted pictures of an object comprising the combination of a camera, a refractive distorting element situated in front of the lens thereof, and a second lens situated in front of said element so as to project to a point adjacent said element a real image of the object, which image is of substantially the same dimensions as the said element.

4. Means for producing a distorted picture of an object comprising a stand, a camera mounted thereon, a refractive distorting element mounted on the optical axis of the camera, means for moving said element in its own plane, a lens mounted in front of said distorting element and on the optical axis of the camera so as to project at a point in proximity to said distorted element an image of the object and means for adjusting said lens along the said optical axis.

5. An attachment for a camera comprising in combination a refractive distorting element, means for rotating said element in its own plane, a lens in front of said element, and means for adjusting said lens to cause it to project at a point adjacent said element a real image of an object, and means for mounting said device on a camera.

In testimony whereof I affix my signature.

GEORGE WILLIAM FORD.